Sept. 15, 1942.    B. F. W. HEYER    2,295,578
BATTERY TESTER
Filed May 3, 1937
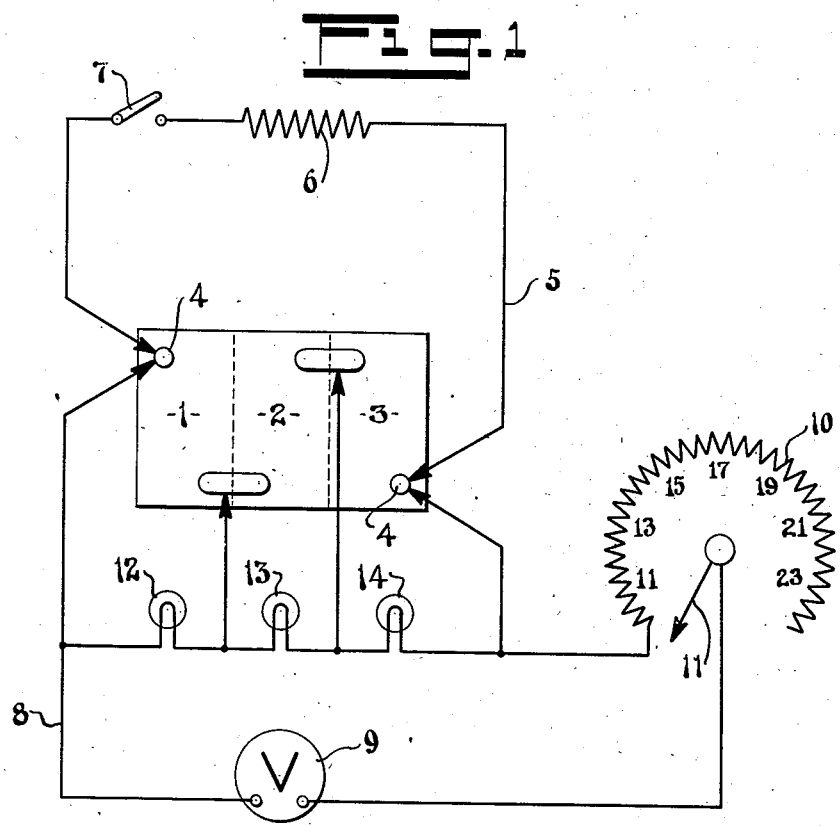
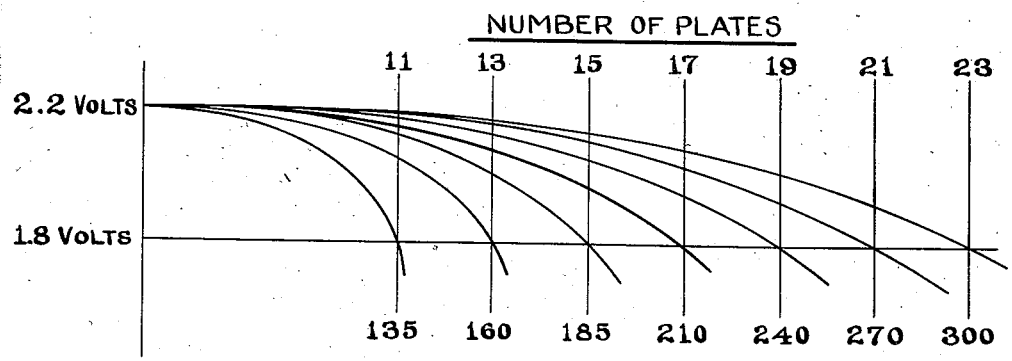
INVENTOR.
Benjamin F. W. Heyer
BY
ATTORNEY.

Patented Sept. 15, 1942

2,295,578

UNITED STATES PATENT OFFICE 2,295,578

BATTERY TESTER

Benjamin F. W. Heyer, Tenafly, N. J., assignor, by mesne assignments, to Atlas Supply Company, Newark, N. J., a corporation of Delaware Application May 3, 1937, Serial No. 140,480

3 Claims. (Cl. 175—183)

My invention relates to new and useful improvements in battery testers and my object is to provide a simple and convenient apparatus by which to ascertain with accuracy and facility when a storage battery is old and worn out and requires replacement and also when a battery requires recharging. In my Patent No. 1,520,865 I describe a battery tester employing a current circuit, including an ammeter and carbon pile in series with the terminals of the battery. By suitably adjusting the carbon pile in accordance with the size of the battery, current is discharged from the battery of a value depending upon the resistance of the circuit. As is well known storage batteries intended for use in automotive practice are of different sizes, provided with an odd number of plates ranging from 11 to 23 per cell. The apparatus disclosed in my said patent also includes a voltage circuit of high resistance, bridging the terminals of the associated group of cells, generally three, or bridging the terminals of each cell and in this voltage circuit or in a shunt thereof, a volt meter is introduced.

In the design of starters and other electrical appliances used with modern automobiles the desired operation is based upon an assumed voltage of approximately 1.8 volts per cell or for three cells in series, this assumed voltage is 5.4 volts. With a new battery fully charged the open circuit voltage per cell is approximately 2.2 volts (or for three associated cells approximately 6.6 volts) so that under operating conditions there may be an overall drop of 1.2 volts (.4 volt per cell) before the voltage has fallen to the assumed standard for which the electrical equipment is designed.

Assuming an 11 plate battery to be under test, the carbon pile referred to is adjusted so that the ammeter indicates approximately 135 amperes, which may be read as such on the ammeter or instead the ammeter may be marked at the appropriate point with the notation "11 plates." With such a discharge rate there will be a voltage drop, which with a new charged battery will show a reading on the volt meter of approximately 5.4 volts and this may be noted as such, although in practice I subdivide the scale, from 5.4 volts to approximately 6.5 volts, into a zone marked "good," and from 5.4 volts to 4.8 volts a zone marked "fair;" this subdivision of the two zones is somewhat arbitrary. Usually I indicate on the volt meter a third zone marked "recharge or replace" extending for any desired distance below the 4.8 volt indication.

Assuming the battery to be charged, then if the voltage drop falls below 5.4 volts, replacement may be necessary and if below 4.8 volts is recommended. On the other hand, when the battery is brought in for test, a voltage drop below 5.4 volts may indicate merely that the battery requires recharging.

The procedure just described is carried out in the same way with batteries having a larger number of plates, the carbon pile being adjusted to indicate the value of current (corresponding to the number of plates) which will cause the voltage to drop to 5.4. Thus, for a 13 plate battery this current will be approximately 160 amperes, for a 15 plate battery approximately 185 amperes, for a 17 plate battery 210 amperes and so on.

My present battery tester operates upon the same general principles as the tester of my patent above mentioned but, while securing substantially equal accuracy, I cheapen somewhat the cost of the apparatus by dispensing with the ammeter and carbon pile and using a simple and inexpensive adjustable rheostat, arranged as I will now describe.

In the first place, I make use of a current circuit bridging the battery terminals and I arrange therein a suitable calibrated resistance which will allow for a standard value of current to traverse the circuit. Usually this standard corresponds to approximately 135 amperes. Under this assumption, when the switch is closed and with an 11 plate battery the voltage will drop to approximately 5.4 volts. Should the voltage fall below this figure, the indication is that the battery should be replaced or recharged, as I have above explained.

If we now assume that the tester is used with a new fully charged battery of larger capacity, for example, one having 13 plates, it would require 160 amperes to bring the voltage down to 5.4 (see Figure 2). However, since we have not changed the standard resistance, but have reduced the internal resistance of the battery (because of more plate area) the voltage drop will be low, probably only to 5.7 and the current in the resistance will be slightly greater, probably about 142 amperes total. Since we have already marked the voltmeter at 5.4 volts for the 11 plate battery, the voltmeter therefore if used alone as in my said patent, would give a false indication and the error would increase in value as the number of plates of the battery under test increased.

However, by employing in series with the voltmeter a simple adjustable rheostat, the latter may be adjusted so as to increase the resistance of the voltage circuit to correct the error in question and thus adapt the battery tester for the testing of batteries of widely different capacities. When a highly adjustable rheostat is thus used, it becomes in fact a battery size selector and therefore the various points of adjustments may be conveniently marked with the notations "11 plate," "13 plate" "15 plate" and so on, for the convenience of the operator.

If desired, a simple switch may be employed in the first circuit to permit a voltage reading to be secured under open circuit conditions. It will be also understood that the tester may be arranged to indicate the condition of each individual cell, as for example, by employing a small low resistance lamp connected across each cell so that the operator may be informed by the respective brightness of these lamps whether any particular cell or cells of the group are good or bad. Instead of this arrangement, the same results can be secured by employing a small volt meter for indicating the respective voltages of the cells and by either way the owner of the battery can be advised whether to replace it or not.

It will be seen that the critical condition of a battery is confined within quite narrow limits. When tested under charged conditions, a difference in voltage drop of only two-tenths of one volt may indicate the difference between a fairly good battery and one that is hopelessly bad. Yet, if the volt meter indications are arranged in arithmetical order from zero to seven a difference of two-tenths on the scale would represent less than three per cent of the entire scale, which to the layman would be wholly without a significance.

Therefore, I prefer to make use of a special type of volt meter which will operate in such a way that the movements of the pointer in connection with the critical portion of the scale will be greatly extended. For instance, in practice I have made use of volt meters having scales extending over an angle of 86 degrees from zero to 6.5, where the critical portions of the scale corresponding to "fair" and "good" extend for an angle of 33 degrees or from 5.4 to 6.5.

In order to obtain this result, I prefer to make use of a meter of the movable coil type where the core between the pole pieces is formed with a slot so as to greatly weaken the flux when the coil is coincident therewith. In this way a disproportionately greater voltage rise is required to move the coil past the space occupied by the slot than when the coil cooperates with the unslotted part of the core. The volt meter in question forms a desirable but not a necessary part of my improved battery tester and is claimed herein as a part of the combination.

In order that my invention may be better understood, attention is directed to the accompanying drawing, forming part of this specification and in which Figure 1 is a diagrammatic view illustrating the invention in an approved form and Figure 2 is a chart showing how the voltage drops with batteries having plates ranging from 11 to 23.

Referring first to Figure 2 and assuming that 1.8 volts per cell is taken as the standard voltage for which the electrical equipment is designed, it will be noted that in order to bring about a voltage drop from 2.2 volts to 1.8 volts the current will vary progressively from approximately 135 amperes for an 11 plate cell to 300 amperes for a 23 plate cell.

Having reference now to Figure 1, I show three storage battery cells 1, 2 and 3 connected in series in the usual way. From the terminals 4—4 extends a current circuit 5. Connection may be made with the terminals 4 by the customary clips, well known in the art. In the circuit 5 is a fixed resistance 6, so calculated that when a certain value of current from a battery having 11 plate cells, approximately 135 amperes, flows through the circuit 5, the voltage drop per cell under charged conditions will be from 2.2 volts to 1.8 volts. A switch 7 may be located in the circuit 5, to permit a voltage reading under open-circuit conditions, but this switch while useful is not necessary.

Extending between the terminals 4—4 is a voltage circuit 8 and associated with said circuit is a volt-meter 9. In the volt meter circuit is an adjustable rheostat 10 having a contact arm 11 by which resistances of increasing values may be included in the voltage circuit 8. The rheostat 10 is really an adjustable multiplier and it acts as a battery size selector. Therefore the contact arm 11 may cooperate with indications (11, 13 etc.) as shown corresponding with the position said contact arm shall occupy depending upon the number of plates in the battery under test. It will be noted that as shown a small part of the rheostat resistance is included in the voltage circuit when an 11 plate battery is being tested. The resistance of the voltage circuit is high, so that only a few milliamperes flows through it, and that resistance is such, that when a current of approximately 135 amperes is drawn from an 11-plate battery, with the contact arm 11 on the indication 11, the voltmeter will indicate 5.4 volts (1.8 per cell) assuming the battery to be charged and in good condition. If the battery is known to be charged, a voltage drop below 5.4 suggests the need of replacement; otherwise it may only suggest the need of recharging.

If now a 13-plate battery is under test, assuming it to be charged and in good condition, with the contact arm still remaining on 11, the current flow will remain at 135 amperes, but as shown in Figure 2, this will not be sufficient to cause a voltage drop to 1.8 per cell; the actual indication will be higher, in the neighborhood of 1.9 volts. The resulting error may be corrected by moving the contact arm 11 to introduce additional resistance in the voltage circuit, i. e. to the indication 13 on the rheostat.

Under normal conditions, the voltmeter 9 will thus give the same reading for a 13-plate battery as it does for an 11-plate battery. And the same is true of batteries of greater capacity, it being only necessary to adjust the rheostat or battery size selector, as to introduce the needed additional resistance in the voltage circuit as will be understood. Thus, by using an ampere circuit of fixed resistance and a voltage circuit of variable resistance, I am enabled to dispense with the ammeter and carbon pile of my above mentioned patent, while securing readings of equal accuracy and with equal facility.

If desired, auxiliary means may be employed for indicating differences in the condition of the several cells, for instance small low voltage lamps 12, 13 and 14 connected with the cells 1, 2 and 3, respectively. Differences in the brightness of these lamps may indicate that the bad condition of a battery may be due to only one or two cells and not to all three. A similar result will be secured by substituting small volt meters for the lamps.

The volt meter 9 may be of the usual type with the indications in arithmetical order. However, as before pointed out, I prefer to use a volt meter in which the movements of the pointer are disproportionately great where the readings are critical. With an arithmetical scale, close reading is difficult and to the average automobile owner, slight variations which may be vital are wholly without significance.

What I claim is:

1. In a storage battery tester, the combination with the cell or cells to be tested of an ampere circuit connected with the terminals thereof, a fixed resistance in the ampere circuit, a voltage circuit connected across said terminals, a volt meter in the latter circuit and an adjustable rheostat associated with said volt meter.

2. In a storage battery tester, the combination with the cell or cells to be tested, of an ampere circuit connected with the terminals thereof, a fixed resistance in the ampere circuit, a voltage circuit connected across said terminals, a volt meter in the latter circuit, an adjustable rheostat associated with said volt meter and plate or other battery size indications on said rheostat whereby it becomes a battery size selector.

3. In a storage battery tester, an ampere circuit adapted to be connected to the terminals of the battery cell or cells to be tested, a fixed resistance interposed in the ampere circuit, a voltage circuit also adapted to be connected across said terminals, a voltmeter interposed in the voltage circuit, an adjustable rheostat associated with the voltmeter, and plate or other battery size indications associated with said rheostat whereby the latter becomes a battery size selector.

BENJAMIN F. W. HEYER.